United States Patent [19]
Klemm et al.

[11] Patent Number: 5,948,717
[45] Date of Patent: Sep. 7, 1999

[54] DENSE SILICON NITRIDE COMPOSITE MATERIAL

[75] Inventors: Hagen Klemm, Dresden; Mathias Herrmann, Meissen; Katja Tangermann; Christian Schubert, both of Dresden, all of Germany

[73] Assignee: Fraunhofer-Gesellschaft, Munich, Germany

[21] Appl. No.: 08/856,486

[22] Filed: May 14, 1997

Related U.S. Application Data

[63] Continuation of application No. 08/586,215, Jan. 16, 1996, abandoned.

[30] Foreign Application Priority Data

Jan. 13, 1995 [DE] Germany ............................ 195 00 832

[51] Int. Cl.$^6$ .......................... C04B 35/596; C04B 35/58
[52] U.S. Cl. ...................... 501/97.4; 501/96.3; 264/624; 264/683
[58] Field of Search .................................. 501/97.4, 96.3

[56] References Cited

U.S. PATENT DOCUMENTS

| | | |
|---|---|---|
| 4,293,619 | 10/1981 | Landingham et al. . |
| 4,407,971 | 10/1983 | Komatsu et al. . |
| 4,983,554 | 1/1991 | Hsieh . |
| 5,064,789 | 11/1991 | Petrovic et al. . |
| 5,294,575 | 3/1994 | Matsumoto ................................ 501/97 |
| 5,429,997 | 7/1995 | Hebsur ..................................... 501/97 |
| 5,439,855 | 8/1995 | Rosenthal .................................. 501/97 |
| 5,504,047 | 4/1996 | Lukacs, III et al. ....................... 501/97 |

FOREIGN PATENT DOCUMENTS

| | | |
|---|---|---|
| 73523 | 3/1983 | European Pat. Off. . |
| 520211 | 12/1992 | European Pat. Off. . |

OTHER PUBLICATIONS

R. E. Tressler, "Environmental Effects on Long Term Reliability of SiC and $Si_3N_4$ Ceramics," pp. 99–124 in Ceram. Trans., 10 (Corros. Degrad. Ceram.). Edited by R. E. Tressler (1990).

N. Nishimura, E. Masuo, K. Takita and Y. Kobayashi, "Effect of Microstructural Degradation on the Strength of Silicon Nitride after High–Temperature Exposure," pp. 1139–1146 in Proc. 4th Int. Symp. Ceram. Mater. & Components for Engines. Edited by R. Carlson, T. Johansson and T. Kahlman, Elsevier London (1991).

Y. Nakasuji, H. Iwasaki and H. Sakai, "Room–Temperature Strength of Sintered Silicon Nitride Subjected to High–Temerpature Creep Loading," Int. Gas Turbine and Aeroengine Congr. and Expo., The Hague, Netherlands, Jun. 13–16, 1994.

O. Van der Biest, C. Weber, and L. A. Garguet, "Role of Oxidation on Creep and High–temperature Failure of Silicon Nitride," pp. 729–738 in Proc. 3th Int. Symp. Ceram. Mater. & Components for Engines. Edited by V. Tennerey, Columbus OH (1989).

A. A. Wereszczak, K. Breder and M. K. Ferber, "Role of Oxidation in the Time–Dependant Failure Behavior of Hot Isostatically Pressed Silicon Nitride at 1370° C.," J. Amer. Ceram. Soc. 76(11) 2919–22 (1993).

A. A. Wereszczak, M. K. Ferber, T. P. Kikland and K. L. More, "Evolution of Stress Failure Resulting from High–temperature Stress–Corrosion Cracking in a Hot Isostatically Pressed Silicon Nitride," J. Amer. Ceram. Soc. 78(8) 2129–40 (1995).

J. J. Petrovic and R. E. Honnell, "$MoSi_2$ Particle Reinforced–$SiC$ and $Si_3N_4$ Matrix Composites," Journ. of Mater. Sci. Letters 9(1990) 1083–1084.

J. Cook, A. Khan, E. Lee and R. Mahapatra, "Oxidation of $MoSi_2$–based Composites," Mater. Sci. and Engineering A155(1992) 183–198.

Ming–yuan Kao, "Properties of Silicon Nitride–Molybdenum Disilicide Particulate Ceramic Composites," J. Amer. Ceram. Soc. 76(11) 2879–83 (1993).

R. L. K. Matsumoto and G. G. Weaver, "High–Temperature Properties of a Silicon Nitride–Intermetallic Silicide Composite," Ceram. Eng. Sci. Proc. 12(9–10) pp. 1690–1696 (1991).

*Primary Examiner*—Karl Group
*Attorney, Agent, or Firm*—Evenson, McKeown Edwards & Lenahan P.L.L.C.

[57] ABSTRACT

The invention discloses a dense silicon nitride composite material which may be used as a high-temperature component in building armatures and motors with a long service life and high reliability even at higher temperatures. More specifically, the invention discloses a dense silicon nitride composite material containing 3 to 50 wt. % of a reinforcing component, in which the reinforcing component contains 10 to 90 wt. % $Me_5Si_3$ and the remaining portion is either $MeSi_2$ or $MeSi_2$ and silicides with other stoichiometries and Me is a metal or a mixture of metals. The present invention is made by a method in which the material is produced by sintering and/or hot pressing and/or hot isostatic pressing and the reinforcing components are added as $Me_5Si_3$ and $MeSi_2$ powder or as a preliminary stage in which, until closed porosity is achieved, a nitrogen pressure/temperature ratio corresponding to a predetermined relationship is maintained which results in the formation and stabilization of $Me_5Si_3$.

22 Claims, 1 Drawing Sheet

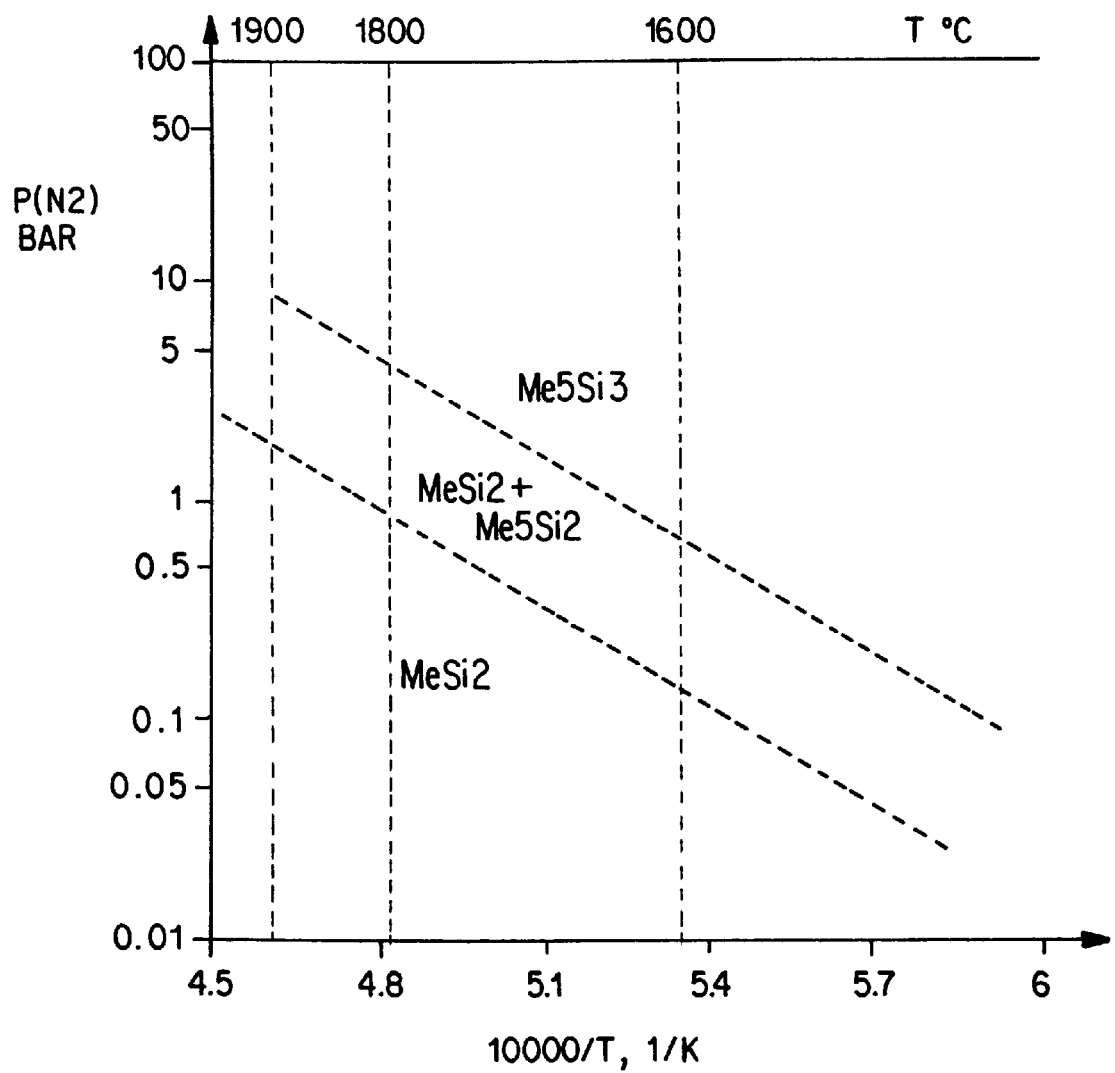

DENSE SILICON NITRIDE COMPOSITE MATERIAL

This is a continuation of application Ser. No. 08/586,215, filed Jan. 16, 1996, now abandoned.

BACKGROUND AND SUMMARY

The present invention relates to the field of construction ceramics and more particularly to a dense silicon nitride composite material based on polycrystalline silicon nitride sintered bodies, as well as a method for manufacturing such a material. The present invention may be used as high-temperature components in building armatures and motors, as well as in the energy field.

Ceramic materials are far superior to metallic superalloys for usage at higher temperatures. Silicon nitride materials are especially suited for use at high temperatures, and in fact have excellent mechanical properties both at room temperature and at high temperatures.

However, one of the most significant disadvantages of these materials is their insufficient chemical resistance to oxygen at high temperatures. Usually, in order to alleviate this problem, the grain boundary phase in the material is modified (composition or crystallization of the amorphous glass phase) or various materials are combined in order to achieve an increase in oxidation resistance (minimization of the relative weight increase). However, even very small oxidation rates can cause serious damage by cracking and pore formation on the surface of the material that is stressed by stretching, which can in turn lead to rapid failure of the part. Therefore, the service life of such a part is often significantly reduced because of such damage, so that such parts are not suitable for applications which require a long service life (see J. Am. Ceram. Soc. 76 (11) 2919–2922 (1993)).

Tests have been performed in order to limit this damage and to increase the strength of the material after high-temperature treatment of up to 1200° C. (see Komatsu et al., U.S. Pat. No. 4,407,971 counterpart of EP Patent No. 73,523, the entire disclosure of which is herein incorporated by reference) Suicides in the form of $Mg_2Si$, $CaSi_2$, $VSi_2$, $CrSi_2$, $MnSi$, $ZrSi_2$, $NbSi_2$, $MoSi_2$, $TaSi_2$, and $WSi_2$ were added in amounts of from 0.1 to 5 wt. % to a silicon nitride material. The results showed improved strength of these materials as compared to materials of the prior art. Nevertheless, the results obtained for parts made of these materials are still inadequate for use at higher temperatures and for a long service life.

Therefore, a goal of the present invention is to provide a dense silicon nitride composite material which has a long service life and high reliability even at higher temperatures, and a method for manufacturing such a material.

The dense silicon nitride composite material according to the present invention contains 3 to 50 wt. % of a reinforcing component, wherein the reinforcing component consists of a mixture of metal silicide phases with 10 to 90 wt. % $Me_5Si_3$ and 90 to 10 wt. % either $MeSi_2$ or $MeSi_2$ and suicides of other stoichiometries, whereby once again, 10 to 90 wt. % is $MeSi_2$ and 90 to 10 wt. % are suicides of other stoichiometries. In any case, Me is a metal or a mixture of metals. This means that the same metal or a different one may be involved in $MeSi_2$ and $Me_5Si_3$. In addition, one of the two or both of the Me's can be a mixture of metals.

In a preferred embodiment, the reinforcing component is present in amounts of from 5 to 40 wt. %. In another preferred embodiment, $Me_5Si_3$ is present in amounts of from 3 to 10 wt. % in relation to the composite material. In another preferred embodiment, $MeSi_2$ is present in amounts of from 8 to 20 wt. %, in relation to the composite material. In another preferred embodiment, $MeSi_2$ and silicides with other stoichiometries are present in amounts of 10 to 30 wt. % in relation to the composite material.

Additionally, in a preferred embodiment, the metal is molybdenum. In another preferred embodiment, the metal is a metal or a mixture of metals selected from the group consisting of molybdenum, tungsten, chromium, tantalum, niobium, manganese, and vanadium.

It is also advantageous for the material according to the present invention to contain one or more sintering aids. Furthermore, it is also advantageous for the material according to the present invention to contain additional reinforcing components in the form of SiC, TiN, TiC or BN.

The present invention also discloses a method for making a dense silicon nitride composite material with 3 to 50 wt. % of a reinforcing component containing a mixture of metal suicides with 10 to 90 wt. % $Me_5Si_3$ and 90 to 10 wt. % $MeSi_2$ or $MeSi_2$ and silicides with other stoichiometries, whereby if $MeSi_2$ and suicides with other stoichiometries are used, once again, 10 to 90 wt. % is $MeSi_2$ and 90 to 10 wt. % are silicides with other stoichiometries. In any case, Me is a metal or a mixture of metals. According to the present invention, the dense silicon nitride composite material is produced by sintering and/or hot pressing and/or hot isostatic pressing, and the reinforcing component is added in the form of metal silicide powder in powder metallurgy fashion or as a preliminary stage of the metal suicides whereby a nitrogen pressure/temperature ratio is set, as shown in the FIGURE, until closed porosity is reached, which results in the formation and stabilization of $Me_5Si_3$.

According to a preferred embodiment, $Me_5Si_3$ and $MeSi_2$ are formed from one of their preliminary stages during plasma or gas phase synthesis of silicon nitride powder with metal dopings. In another preferred embodiment, $Me_5Si_3$ and $MeSi_2$ are formed from one of their preliminary stages through chemical synthesis with the decomposition of silicoorganic precursors with metal ions. In another preferred embodiment, $Me_5Si_3$ and $MeSi_2$ are formed from one of their preliminary stages by reduction of precipitated oxidic compounds of the metals. In yet another preferred embodiment, $Me_5Si_3$ and $MeSi_2$ are formed by powder metallurgy from metals, metal carbides, metal borides or metal nitrides.

Another advantage of the silicon nitride composite materials produced according to the present invention is improved creep properties under certain conditions.

Other objects, advantages and novel features of the present invention will become apparent from the following detailed description of the invention when considered in conjunction with the accompanying drawings.

BRIEF DESCRIPTION OF THE DRAWING

The sole FIGURE is a graph showing the relationship between nitrogen pressure and temperature for the formation of various phases of metal silicides.

DETAILED DESCRIPTION OF THE INVENTION

The invention will now be described with reference to several examples. Examples 1 and 2 represent the prior art. Example 6 represents the most preferred embodiment with respect to time to failure as depicted in the tables below.

Table 1 shows the ratio of $MeSi_2/MeSi_2+Me_5Si_3$, the increase in weight following 1000 h of oxidation at 1400° C. in mg/cm², and the time to failure in a service life test for Examples 1 to 6. Table 2 shows the ratio of silicide phases in wt. % based on the composite material, the weight increase after 1,000 h of oxidation at 1400° C. in mg/cm², and the time to failure in a service life test for Examples 7 to 9.

EXAMPLE 1

$Si_3N_4$ powder was mixed with 12 wt. % $Nd_2O_3$ and 0.5 wt. % AlN in a planetary ball mill in isopropanol, dried in a rotary vacuum evaporator, and baked at 450° C. Then the powder mixture was hot pressed at 1800° C. Bending strength rods were then produced from the material thus obtained and were subjected to a service life test in air at 1400° C. and 300 MPa.

EXAMPLE 2

$Si_3N_4$ powder was mixed with 10 wt. % $Y_2O_3$ in a planetary ball mill in isopropanol and evaporated in a laboratory rotary evaporator. Then the powder was isostatically cold pressed into bars measuring 25×25×60 mm at 200 MPa. These bars were sintered at 1900° C. under $N_2$ pressure of 100 bars for two hours. Bending strength rods were produced from the material thus obtained and were subjected to a service life test in air at 1400° C. and 300 MPa.

EXAMPLE 3

$Si_3N_4$ powder was mixed with 12 wt. % $Nd_2O_3$ and 0.5 wt. % AlN and 10 wt. % $MoSi_2$ in a planetary ball mill in isopropanol, dried in a rotary vacuum evaporator, and baked at 450° C. The product was then sintered at 1900° C. under an $N_2$ pressure of 100 bars for 2 hours. A material with 7 wt. % $MoSi_2$ and 7 wt. % $Mo_5Si_3$ based on the composite material was thus produced and made into bending strength rods that were subjected to a service life test in air at 1400° C. and 300 MPa.

EXAMPLE 4

$Si_3N_4$ powder was mixed with 12 wt. % $Nd_2O_3$ and 0.5 wt. % AlN and 10 wt. % $Mo_2C$ in a planetary ball mill in isopropanol, dried in a rotary vacuum evaporator, and baked at 450° C. Then the powder mixture was hot pressed at 1800° C. A material with 2.5 wt. % $MoSi_2$ and 10 wt. % $Mo_5Si_3$ based on the composite material was thus obtained and made into bending strength rods that were subjected to a service life test in air at 1400° C. and 300 MPa.

EXAMPLE 5

$Si_3N_4$ powder was mixed with 12 wt. % $Nd_2O_3$ and 0.5 wt. % AlN and 15 wt. % W in a planetary ball mill in isopropanol, dried in a rotary vacuum evaporator, and baked at 450° C. Then the powder mixture was hot pressed at 1800° C. A material with 13 wt. % $WSi_2$ and 5.5 wt. % $W_5Si_3$ based on the composite material was thus produced and made into bending strength rods that were subjected to a service life test in air at 1400° C. and 300 MPa.

EXAMPLE 6

$Si_3N_4$ powder was mixed with 10 wt. % $Y_2O_3$ and 10 wt. % $MoSi_2$ in a planetary ball mill in isopropanol and dried in a laboratory rotary evaporator. Then the powder was isostatically cold pressed into bars measuring 25×25×60 mm at 200 MPa. These bars were sintered at 1900° C. under an $N_2$ pressure of 100 bars for 2 hours. A material with 3.5 wt. % $MoSi_2$ and 9 wt. % $Mo_5Si_3$ based on the composite material was thus produced and made into bending strength rods that were then subjected to a service life test in air at 1400° C. and 300 MPa.

TABLE 1

Results of Service Life Tests in Air at 1400° C. and 300 MPa

| Example | Ratio $MeSi_2/Me$ $Si_2 + Me_5Si_3$ | Increase in weight following 1000 h of oxidation at 1400° C. in mg/cm² | Time to failure in service life test |
|---|---|---|---|
| 1 | 0 | 1.7 | 47 h |
| 2 | 0 | 1.9 | 37 h |
| 3 | 0.5 | 3.8 | no failure after 200 h |
| 4 | 0.2 | 3.0 | 179 h |
| 5 | 0.7 | 4.1 | 198 h |
| 6 | 0.3 | 0.8 | no failure after 700 hours |

EXAMPLE 7

$Si_{N4}$ powder containing 12 wt. % $Y_2O_3$ was mixed with 10 wt. % of a mixture of $MoSi_2$ and $WSi_2$ in a planetary ball mill in isopropanol, dried in a rotary vacuum evaporator and baked at 450° C. Then the powder mixture was hot pressed at 1800° C. From the material thus produced, bending strength rods were made that were then subjected to a service life test in air at 1400° C. and 450 MPa.

EXAMPLE 8

$Si_3N_4$ powder containing 12 wt. % $Y_2O_3$ was mixed with 10 wt. % of a mixture of $MoSi_2$ and $WSi_2$ in a planetary ball mill in isopropanol, dried in a rotary vacuum evaporator and baked at 450° C. Then the powder mixture was hot pressed at 1800° C. Bending strength rods were made from the resultant material which were then subjected to a service life test in air at 1450° C. and 300 MPa.

EXAMPLE 9

$Si_3N_4$ powder containing 12 wt. % $Y_2O_3$ was mixed with 20 wt. % of a mixture of $VSi_2$ and $WSi_2$ in a planetary ball mill in isopropanol, dried in a rotary vacuum evaporator and baked at 450° C. Then the powder mixture was hot pressed at 1800° C. Bending strength rods were made from the resultant material and then subjected to a service life test in air at 1400° C. and 450 MPa.

TABLE 2

Results of Service Life Tests in Air

| Example | Ratio of silicide phases, wt. % | Weight increase after 1,000 h of oxidation at 1400° C. in mg/cm² | Time to failure in service life test |
|---|---|---|---|
| 7 | 3% $WSi_2$ + 4% $MoSi_2$ + 3% $Mo_5Si_3$ | 0.8 | Still no failure at 1400° C. and 450 MPa after 500 h |
| 8 | 3% $WSi_2$ + 4% $MoSi_2$ + 3% $Mo_5Si_3$ | 0.8 | Still no failure at 1450° C. and 300 MPa after 500 h |

TABLE 2-continued

Results of Service Life Tests in Air

| Example | Ratio of silicide phases, wt. % | Weight increase after 1,000 h of oxidation at 1400° C. in mg/cm$^2$ | Time to failure in service life test |
|---|---|---|---|
| 9 | 10% VSi$_2$ + 5% WSi$_2$ + 5% W$_5$Si$_3$ | 0.7 | Still no failure at 1400° C. and 450 MPa after 500 h |

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Dense silicon nitride composite material comprising 3 to 50 wt. % of a reinforcing component, wherein the reinforcing component comprises a mixture of metal silicide phase, said mixture comprising:
   a) a first portion of 10 to 90 wt. % Me$_5$Si$_3$ based upon the reinforcing component and
   b) a second portion of 90 to 10 wt. % based upon the reinforcing component of
      i) MeSi$_2$ or
      ii) MeSi$_2$ and suicides of other stoichiometries, in which 10 to 90 wt. % is MeSi$_2$ and 90 to 10 wt. % are suicides of other stoichiometries, and
   wherein Me is a metal or a mixture of metals.

2. The material according to claim 1, comprising 5 to 40 wt. % of the reinforcing component.

3. The material according to claim 1, comprising 3 to 10 wt. % Me$_5$Si$_3$ based on the composite material.

4. The material according to claim 1, comprising 8 to 20 wt. % MeSi$_2$ based on the composite material.

5. The material according to claim 1, comprising 10 to 30 wt. % MeSi$_2$ and suicides of other stoichiometries based on the composite material.

6. The material according to claim 1, wherein the metal is molybdenum.

7. The material according to claim 1, wherein the metal is selected from the group consisting of molybdenum, tungsten, chromium, tantalum, niobium, manganese, vanadium and mixtures thereof.

8. The material according to claim 1, comprising at least one sintering aid.

9. The material according to claim 1, comprising additional reinforcing components selected from the group consisting of SiC, TiN, TiC, and BN.

10. The material according to claim 1, wherein the metal in the first portion and the metal in the second portion are the same.

11. The material according to claim 1, wherein the metal in the first portion and the metal in the second portion are different.

12. The material according to claim 1, wherein at least one of the metals in the first portion and the second portion is a mixture of metals.

13. Method for manufacturing a dense silicon nitride composite material comprising 3 to 50 wt. % of a reinforcing component comprising a mixture of metal silicides phases with 10 to 90 wt. % Me$_5$Si$_3$ based upon the reinforcing component and 90 to 10 wt. % MeSi$_2$ or MeSi$_2$ and silicides of other stoichiometries based upon the reinforcing component, in which 10 to 90 wt. % is MeSi$_2$ and 90 to 10 wt. % are silicides of other stoichiometries, and me is a metal or mixture of metals, comprising the steps of:
   (a) heat treating the materials, and
   (b) adding the reinforcing component in the form of a metal silicide powder.

14. The method according to claim 13, wherein the step of heat treating is by sintering.

15. The method according to claim 13, wherein the step of heat treating is by hot pressing.

16. The method according to claim 13, wherein the step of heat treating is by hot isostatic pressing.

17. The method according to claim 13, wherein the step of adding the reinforcing component in the form of a metal silicide powder is by powder metallurgy.

18. The method according to claim 17, wherein the step of adding the reinforcing component in the form of a metal silicide powder by powder metallurgy includes forming Me$_5$Si$_3$ and MeSi$_2$ from the compound selected from the group consisting of metals, metal carbides, metal borides and metal nitrides.

19. The method according to claim 13, wherein the step of adding the reinforcing component in the form of a metal silicide powder is as a preliminary stage of the metal suicides wherein a nitrogen pressure/temperature ratio is set until closed porosity is achieved, which results in the formation and stabilization of Me$_5$Si$_3$.

20. The method according to claim 19, wherein the step of adding the reinforcing component in the form of a metal silicide powder as a preliminary stage of the metal silicides includes forming Me$_5$Si$_3$ and MeSi$_2$ from one of the preliminary stages during plasma or gas phase synthesis of silicon nitride powder with metal dopings.

21. The method according to claim 19, wherein the step of adding the reinforcing component in the form of a metal silicide powder as a preliminary stage of the metal silicides includes forming Me$_5$Si$_3$ and MeSi$_2$ from one of the preliminary stages by chemical synthesis involving decomposition of silicoorganic precursors with metal ions.

22. The method according to claim 19, wherein the step of adding the reinforcing component in the form of a metal silicide powder as a preliminary stage of the metal suicides includes forming Me$_5$Si$_3$ and MeSi$_2$ from one of the preliminary stages by reduction of precipitated oxidic compounds of the metals.

* * * * *